United States Patent [19]

Archang

[11] Patent Number: 4,834,677
[45] Date of Patent: May 30, 1989

[54] MALE AND/OR FEMALE ELECTRICAL CONNECTORS

[75] Inventor: Homayoun Archang, Valencia, Calif.
Grigor Sarian, Los Angeles, Ca.

[73] Assignee: Baxter Travenol Laboratories, Inc., Deerfield, Ill.

[21] Appl. No.: 219,921

[22] Filed: Jul. 15, 1988

Related U.S. Application Data

[63] Continuation of Ser. No. 36,887, Apr. 10, 1987, abandoned.

[51] Int. Cl.[4] .............................................. H01R 19/28
[52] U.S. Cl. .................................... 439/660; 439/638; 439/870
[58] Field of Search ............... 439/638, 660, 668, 676, 439/723, 724, 733, 746–749, 751, 869–872, 699

[56] References Cited

U.S. PATENT DOCUMENTS

| | | | |
|---|---|---|---|
| 3,757,277 | 9/1973 | Yamanoue et al. | 439/660 |
| 4,556,264 | 12/1985 | Tanaka | 439/660 |
| 4,586,776 | 5/1986 | Ollis et al. | 439/870 |
| 4,698,025 | 10/1987 | Sibernagel et al. | 439/676 |
| 4,737,118 | 4/1987 | Lockard | 439/600 |

Primary Examiner—P. Austin Bradley
Attorney, Agent, or Firm—Perman & Green

[57] ABSTRACT

Electrical snap-fit coupling elements designed for economy of manufacture and simplicity of assembly and use. The present elements comprise female connectors, including male/female connectors, including male/female adaptors, female connector extensions and male connectors or plugs designed to mate with the female connectors to provide an electrical coupling for extension units such as sensing probes.

8 Claims, 6 Drawing Sheets

MALE AND/OR FEMALE ELECTRICAL CONNECTORS

This is a continuation of co-pending application Ser. No. 36,887 filed on Apr. 10, 1987 now abandoned.

BACKGROUND OF THE INVENTION

The present invention relates to electrical connector assemblies such as female connectors, male plugs, adaptors, and the like, particularly for the electrical connection of low voltage conductors such as thermocouple probes to monitoring equipment which receives and interprets the electrical output from the probes.

Reference is made to U.S. Pat. Nos. 4,392,005 and 4,362,166 for their disclosure of low voltage probes and coupling means for electrically-connecting said probes to wires or to mating connectors which are in conductive association with monitoring devices of the general type disclosed by U.S. Pat. No. 4,203,096, for example.

Generally, low voltage medical probes are designed to be inexpensive and to have quick interconnection or coupling means so as to be practical for single use and rapid replacement. The coupled probe must be connectable directly to the input wiring or mating input socket of the monitoring equipment, or to a coupling means which is so connected, such as the female connector of U.S. Pat. No. 4,392,005.

Prior known quick-connect means for connecting low voltage probes to couplers are unsatisfactory for a variety of reasons. The couplers of U.S. Pat. Nos. 4,392,005 and 4,362,166, for example, are unsuitable for use unless special probes having specific plugs or contact means which mate with the couplers are used. The probe contact means of U.S. Pat. No. 4,392,005 are relatively flimsy, require tedious manual assembly and provide delicate narrow wire contact points for electrical connection with mating contacts compressed there against upon closure of the jaws of the coupling means. The probe contact means or plug of U.S. Pat. No. 4,362,166 comprises a tubular sleeve through which the wires must be fed to contacts and wraps 34. This also requires tedious manual assembly which increases the cost of manufacturing such probes.

Moreover, the couplers of these Patents are expensive to manufacture, and exert a force upon the probe contact wires which can result in breakage and destruction of the probe, such as when the coupler jaws of U.S. Pat. No. 4,392,005 are closed to compress the male connector, and when the wires of the male plug of U.S. Pat. No. 4,362,166 are pushed into engagement with the coupler contact wires.

Attempts to provide alternative coupling means and/or adaptors which permit the quick interconnection of probes having inexpensive male connectors have proven less successful than desired because such couplers require several parts, are expensive to manufacture, due to the requirement for several manual assembly steps, and are unreliable. Moreover it is essential that the coupler must provide a strong frictional engagement with the male contact of each disposable probe engaged therein over its effective lifetime, thereby assuring a reliable positive electrical contact with each repeated use.

SUMMARY OF THE INVENTION

The present invention relates to novel electrical coupling elements for providing a reliable, inexpensive and quick interconnection means between an electrical component, such as a sensing probe, and a receiving device, such as a monitor. More specifically the present invention relates to electrical connectors having a female plug-receiving opening at one end and an electrical contact means adjacent the other end, and to male/female coupling adaptors the male end of which adapts to the female connector of patent 4,392,005, and to novel male contact plugs designed to be received within the female plug-receiving openings of such connectors, and to assemblies of such connectors, including adaptors, and such plugs.

Most specifically the invention relates to such connectors and plugs which comprise relatively few component parts, capable of being assembled in association with integral electrical contact plates and wires in a single snap-fit operation and/or soldering, which permits inspection for the proper electrical connection and alignment of the contact plates and wires during assembly and which provides strong frictional engagement between the insulation sleeve and the electrical cable to prevent the application of a pulling force against the areas in which the cable wires unite with the contact plates of the connector.

The novel female connectors and male plugs of the present invention each comprise two molded plastic components, namely a longitudinal outer sleeve having a longitudinal central passage or open-ended compartment, and a longitudinal contact-supporting insert member which snap-fits within said passage or compartment. The contact-supporting member of the present connectors, including coupling adaptors, comprises opposed, flexible, contact-supporting bowed legs at one end thereof, adjacent one end of the opening of the sleeve passage, to provide a plug-receiving female opening having opposed, spaced flexible bowed contact points for receiving and gripping a male plug inserted therein. The contact-supporting insert member of the present plugs comprises means for aligning and securing opposed contact wires in spaced relation thereon, and means for frictionally-engaging the insulation jacket of the cable when the contact member is snap-fitted within the outer sleeve.

DISCUSSION OF THE DRAWINGS

Figure 1:
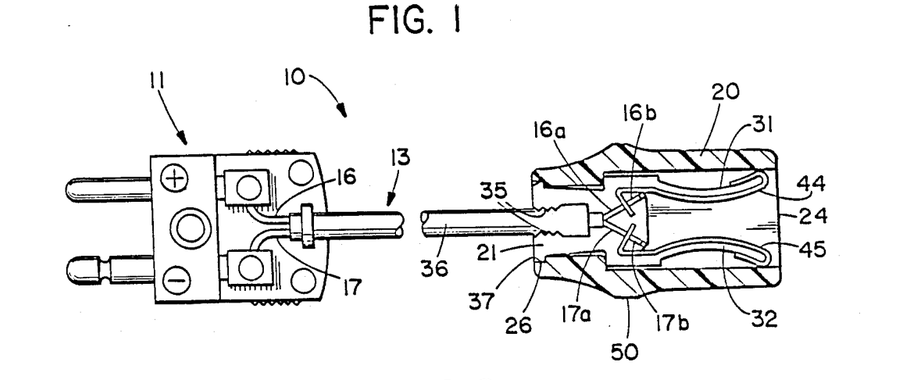
FIG. 1 is a cross-sectional plan view of an electrical extension for connecting an electrical probe to a monitoring device, comprising a conventional monitor plug and a novel female connector according to the present invention.
Figure 2:
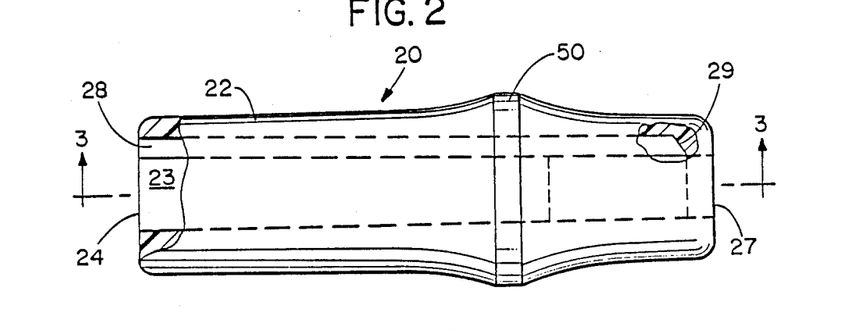
FIG. 2 is an enlarged side view of the outer sleeve of the connector of FIG. 1.
Figure 3:
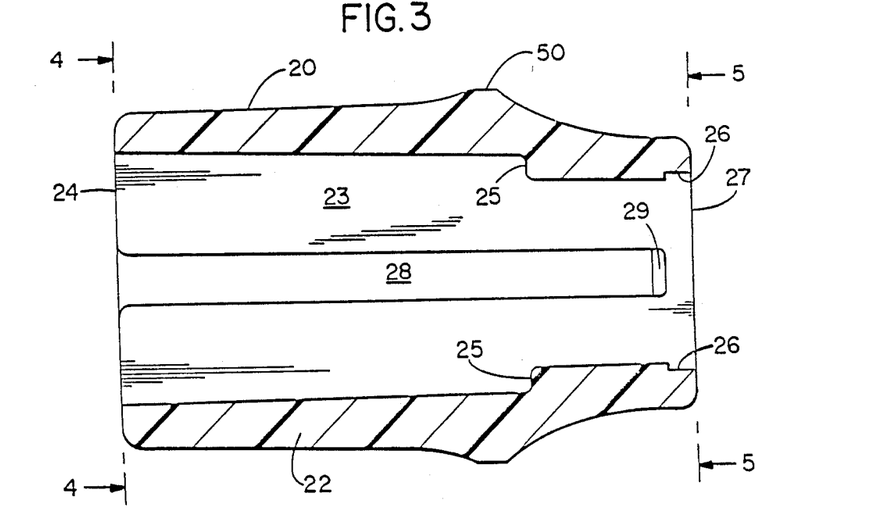
FIG. 3 is a view taken along the line 3—3 of FIG. 2.
Figure 4:
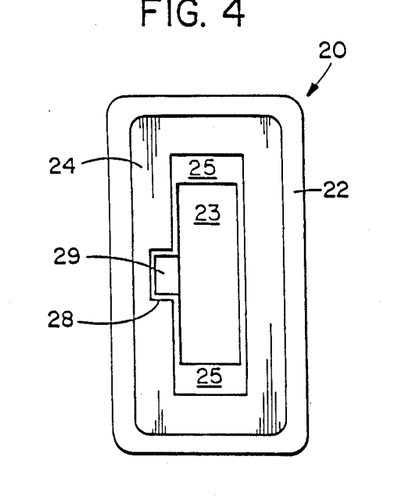
FIGS. 4 and 5 are end views along the lines 4—4 and 5—5 of FIG. 3.
Figure 5:
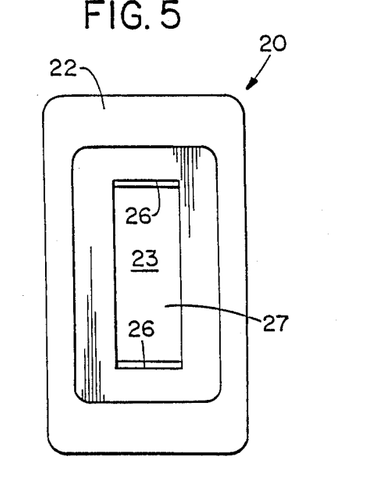

FIG. 1 illustrates a monitor extension 10 comprising a conventional monitor plug 11 and a female coupler connected by means of a length of cable 13. The extension 10 is designed to replace temale couplers of the type illustrated by U.S. Pat. No. 4,392,005 which are connected to a monitor by means of a plug similar to plug 11, and to permit the simple connection of a sensing probe 14, as shown in FIG. 7, thereto by engagement of the male plug 15 of the sensing probe 14 within the novel female coupler of the monitor extension 10.

The cable 13 comprises insulated wires 16 and 17 one end of each being connected to a prong of the monitor plug 11, such as by solder, and the other end of each being connected to a contact, 44 or 45, of the female coupler. The novel female coupler comprises a snap assembly of two components, namely an elongate outer sleeve 20, illustrated more clearly by FIGS. 2 to 5, and a longitudinal contact-supporting female member 21, illustrated more clearly by FIG. 6. The sleeve 20, which is also suitable for use in producing male/female adaptors of the type illustrated by FIGS. 7 to 10, comprises a molded plastic case 22 having a rectangular, open-ended central passage 23 which is wider at the mouth 24 and is narrowed by opposed abutments 25 back to the opposed recesses 26 adjacent the cable port 27 of the sleeve 20. One of the opposed wide inner walls of the central passage 23 is provided with an elongate central groove or slot 28 open from the plug-receiving mouth 24 of the sleeve 20 back to an outwardly inclined, bevelled retainer wall 29 closely spaced inwardly of the opposed opening or port 27.

Figure 7:
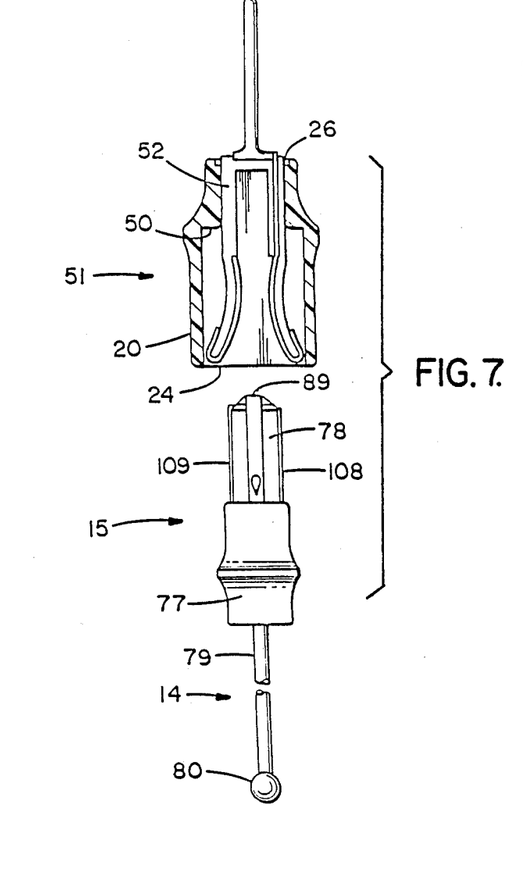
FIG. 7 is a cross-sectional view of a male-female adaptor coupler according to the present invention, shown in spaced preengagement association with a sensing probe element having a male plug according to the present invention.

The elongate slot 28 is important in limiting or preventing the improper insertion or orientation of the contact-supporting female insert member 21 (or the male/female insert member of FIGS. 7 to 10) during initial assembly of the coupler 12 (or the adaptor of FIGS. 7 to 10), and the improper insertion or orientation of the male plug, shown as 15 in FIG. 7, each time a sensing probe, shown as 14 in FIG. 7, is connected to a female coupler 20 according to the present invention. Proper orientation of the contacts is necessary because the sensing probe generally is a thermocouple comprising a metal of a first metal, such as Constantan wire and contact, having constant electrical resistively irrespective of temperature, in association with a second wire and contact of a different metal such as copper. It is necessary that these contacts be connected to contacts of the same metals when the probe is plugged to the female coupler or adaptor, back to the monitoring machine.

Figure 6:
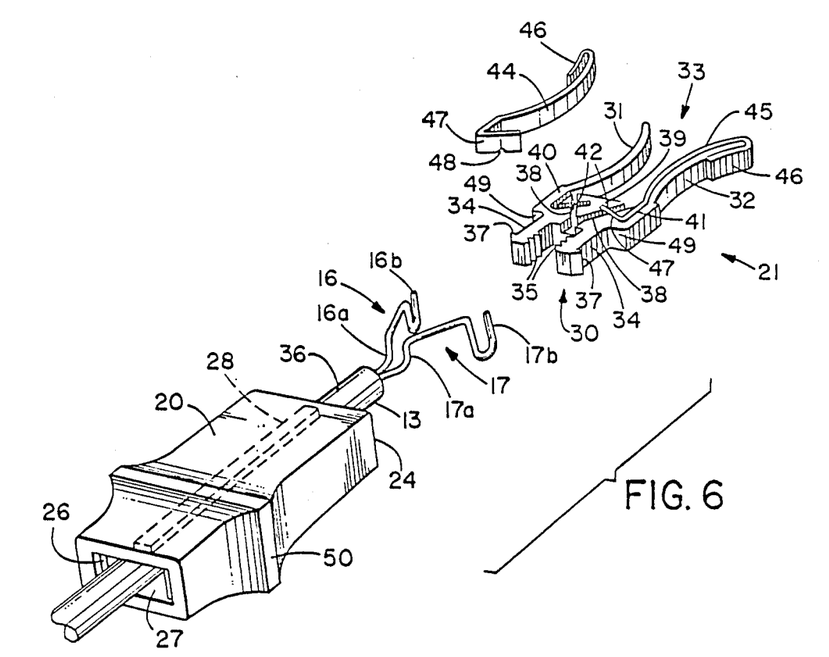
FIG. 6 is a perspective view of the assembly of the female connector of FIG. 1, illustrating the component parts in spaced relation for purposes of clarity.

Referring to FIGS. 1 and 6, the contact supporting female insert 21 comprises a molded plastic body designed to be connected in simple manner to one end of an extension cable, passed through the end 27 of the sleeve 20 and out of end 24 thereof.

The insert 21 is molded to have a cable and wire engagement end 30 and opposed contact-supporting flexible bowed legs 31 and 32 extending therefrom to form a female contact end 33. The engagement end 30 comprises opposed, firm but flexible grip legs 34 spaced from each other by a distance about equal to the width of the cable 13, and having opposed teeth members 35 designed to tightly grip the plastic outer insulation sheath 36 of the cable 13 when the insert 21 is locked within the female sleeve 20 by engagement of the opposed side extensions 37 within the sleeve recesses 26, as illustrated by FIG. 1.

The cable is connected to the insert 21, before snap-in assembly of 21 and 20, by cutting away the cable sheath 36, about ½ inch from the end, to expose the insulation-covered wires 16 and 17, forcing the sheath 36 down between the grip legs 34 and teeth members 35 and extending the exposed insulated wires 16 and 17 over and into the diverging wire-engagement grooves 38 which extend along the upper surface of a contact-retainer portion 39 of the insert 21. The contact-retainer portion 39 is spaced from the connected ends of the bowed legs 31 and 32 by means of opposed transverse, contact-receiving slots 40 and 41, each of which extends parallel to a leg 31 or 32 and then diverts across a wire-engagement groove 38. The point of intersection of the slots 40 and 41 and the grooves 38 is provided with a transverse bore 42.

Flexible metal contact plates 44 and 45 are preformed to correspond in size and shape to the flexible bowed legs 31 and 32 and to the contact-receiving slots 40 and 41. Contact plates 44 and 45 are designed for use with wires 16 and 17 which are solid rather than multi-strand. Each bowed contact plate 44 and 45 has a wrap-around outer end 46 and a diversion tab end 47 provided with an upward notch 48 which cuts through the plastic insulation covers 16a and 17a of the solid wires 16 and 17 when the contacts are forced against the wires, present in grooves 38, during insertion of the contact tab ends 47 of the contact plates 44 and 45 into the receiving slots 40 and 41. Thus, each notch 48 is a cutter of the plastic insulation but not of the solid contact wires 16b and 17b of wires 16 and 17, and the insertion step forces the solid metal contact wires 16b and 17b down into the bores 42 and into intimate electrical engagement with the contact plates 44 and 45. This automatically withdraws the metal contact wires from their plastic insulation covers 16a and 17a, which are too wide to fit down into the bores 42. FIG. 6 illustrates the distorted shape of the metal wires 16b and 17b beyond the cut ends of the plastic insulation covers 16a and 17a, resulting from assembly, and also illustrates one contact plate 44, such as a copper plate, spaced above its receiving slot 40 and receiving leg 31, and the other Constantan contact plate 45 in inserted position within its receiving slot 41, although such position is not normal in the absence of the metal contact wire 17b. Other wires of dissimilar metals can be used in place of copper and Constantan.

When the contact plates 44 and 45 have been inserted within slots 40 and 41, with plate ends 46 in wrap-around engagement with the ends of the bowed legs 31 and 32, the contact insert 21 is pushed into the wide opening or mouth 24 of the housing sleeve 20, with the upper surface of the insert 21, having the wire receiving grooves 38, facing the wide wall of the central passage 23 containing the elongate slot 28. The thickness of the wire insulation covers 16a and 17a extending above grooves 38 is sufficient to prevent insertion of the insert 21 unless the sleeve 20 is properly oriented with the slot 28 positioned to receive the insulation covers 16a and 17a. The insert 21 slides within the sleeve 20 until opposed insert shoulders 49 contact internal sleeve abutments 25 and the insert projections 37, present on flexible grip legs 34 are forced through the narrower end of passage 23 and snap out into the recesses 26, thereby locking the insert against removal from the sleeve 20 to form the properly-wired female coupler 12.

The sleeve 20 is preferably formed, as illustrated, to have an exterior surface which is tapered on all sides from both ends to an intermediate area 50 of maximum width and thickness to provide finger grips which facilitate both pushing of the coupler 12 into engagement with a male plug and pulling of the coupler out of such engagement without applying any pulling force to the wires engaged therein. Wire engagement is further stabilized by the locking forces applied by the teeth members 35 against the flexible plastic sheath 36 of the cable 13 when the insert 21 is locked within the housing sleeve 20.

As is clear from the foregoing, the novel female coupler 12 comprises a minimum number of component parts which are inexpensive to manufacture and simple to assemble in association with the end of an extension cable. The step of inserting the contact plates 44 and 45 into their slots 40 and 41 simultaneously strips the insulation sleeves 16a and 17a to expose the bare solid wires 16b and 17b, deforms the bare wires 16b and 17c into intimate conductive contact with the tab ends 47 of the plates, without the need for wire-stripping, soldering or other time consuming operations. This makes it very practical to provide extensions of the type illustrated by FIG. 1 as inexpensive replacements for other monitor coupling means such as those of U.S. Pat. No. 4,392,005.

In cases where the wires 16 and 17 are of the multi-strand type, rather than solid, it is preferred to manually strip away the insulation covers 16a and 17a and to solder the multi-strand wires 16 and 17 to the contact plates 44 and 45 to assure proper electrical contact. In such cases, the contact plates 44 and 45 are provided with shallow wire-receiving slots or recesses 48a on the upper edge of the diversion tab 47, aligned with the wire-engagement grooves 38, as shown by FIG. 6. This permits the multi-strand wires to be received straight within the grooves 38 and to be soldered to the plates 44 and 45, respectively in the area of plate recesses 48a.

In cases where it is desirable to use monitors having couplers of the type illustrated by U.S. Pat. No. 4,392,005 and to use therewith sensors 14 having insert plugs 15, as shown by FIG. 7, rather than sensors of the type illustrated by said Patent, the present invention provides novel male/female adaptors 51 as illustrated by FIGS. 7 to 10 of the present drawing. Since the elongate outer sleeve of the adaptor is identical to the corresponding sleeve 20 of the coupler 12 of FIGS. 1 to 6, the same reference numbers will be used in identifying the adaptor sleeve 20 and its components in FIGS. 7 and 10. The essential difference between the adaptors 51 and the female couplers 12 resides in the structure and function of the adaptor insert 52, illustrated most clearly in FIGS. 8 and 9.

Figure 8:
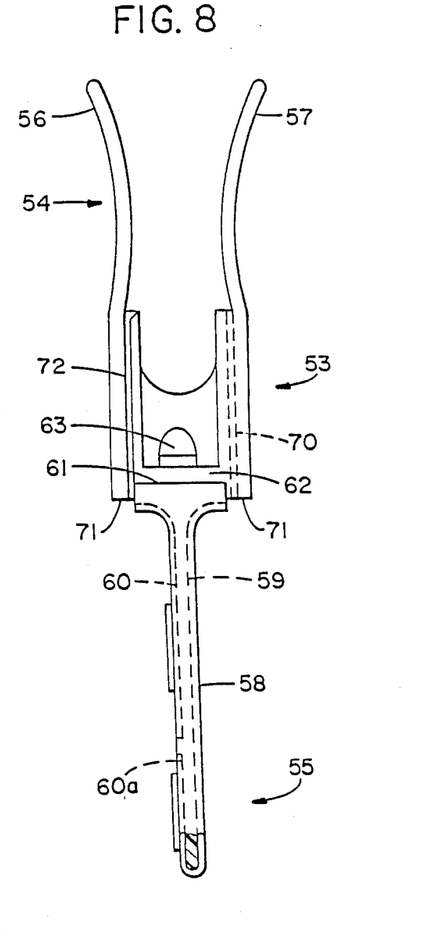
FIGS. 8 and 9 are enlarged plan and side views of the contact-supporting insert member of the adaptor of FIG. 7.
Figure 9:
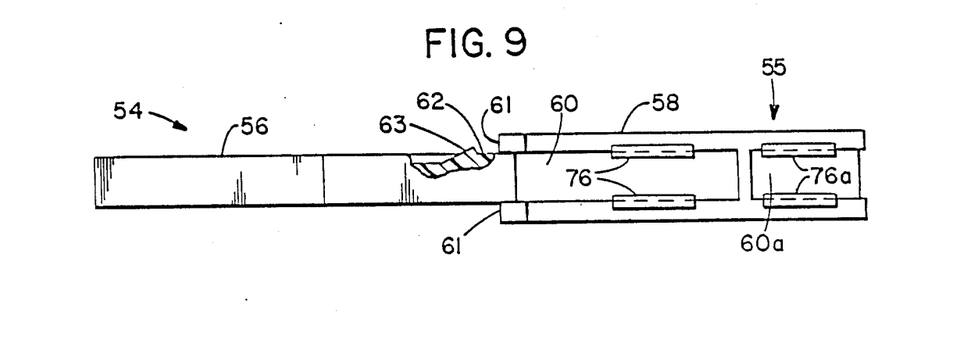

The adaptor insert 52 comprises an elongate, flat molded plastic body 53 having a female contact end 54 and a male contact end 55. The female end 54 comprises opposed elongate flexible, bowed, contact-supporting legs 56 and 57, similar to legs 31 and 32 of the female coupler insert 21 of FIGS. 1 to 6, while the male end 55 comprises an elongate, straight, narrow plastic leg 58 provided with elongate contact-receiving central grooves or recesses 59 and 60 on the opposed wall surfaces thereof. The male end 55 is wider or taller than the female end 54, as shown by FIG. 9, to provide abutments 61 which limit the extent of entry of the adaptor insert 52 into the narrow opening 27 of the housing sleeve 20 during assembly, the height of opening 27 being slightly greater than the height of the female end 54 but less than the height of the male end 55. The core 62 of the insert 52, where the male and female ends 54 and 55 are joined, is provided on its upper surface with a locking ramp 63 which extends a slight distance thereabove and is tapered towards the female end 54, i.e., in the direction of insertion. The core 62 has the same height as the female end 54, except for the ramp 63, and the ramp 63 is spaced from the abutment by a distance slightly greater than the distance between the bevelled retainer wall 29, at the end of slot 28 of the housing sleeve 20, and the end of the housing 20 at port 27 into which the adaptor insert 52 is forced during assembly. The taper of ramp 63 and the slight flexibility of housing sleeve 20 permits the insert 52 to be forced into port 27 until the abutments 61 contact the sleeve 20 and the ramp 63 enters the end portion of slot 28 beyond the retainer wall 29 to lock the insert 52 within the sleeve 20. Proper orientation is predetermined by the alignment of the surface of the insert 52 carrying the ramp 63 and the internal surface of the sleeve 20 having the slot 28, the insert 52 and sleeve 20 being illustrated in FIG. 10 with the locking ramp 63 (not shown) facing down for engagement with the slot 28 and retainer wall 29 on the lower interior surface wall of the housing sleeve 20.

Figure 10:
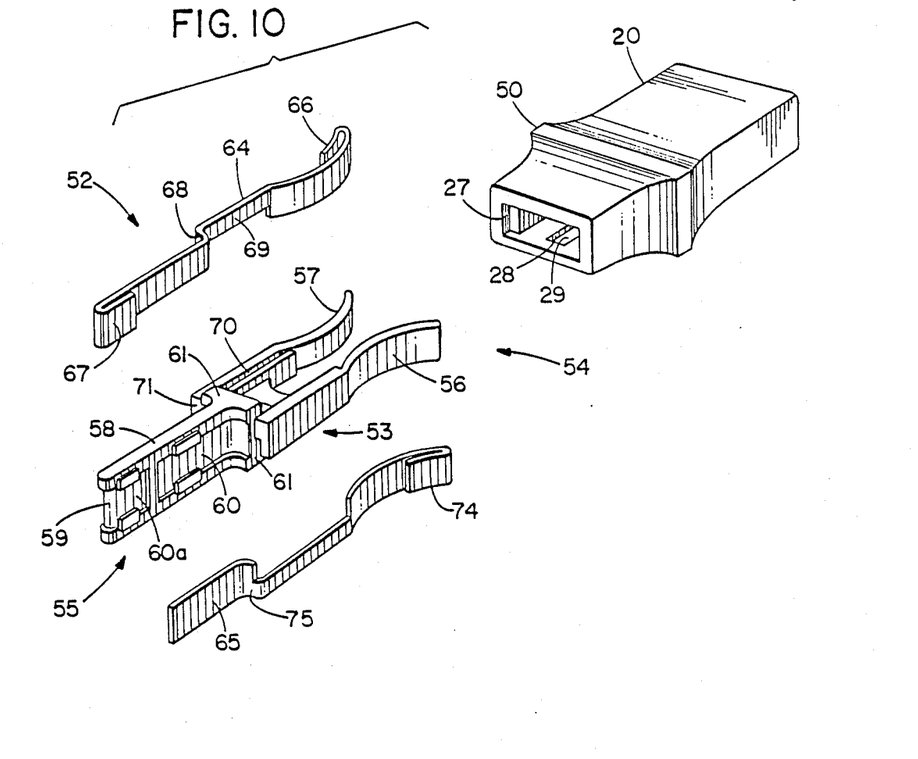
FIG. 10 is a perspective view of the adaptor assembly of FIG. 7 illustrating the component parts in spaced relation.
Figure 11:
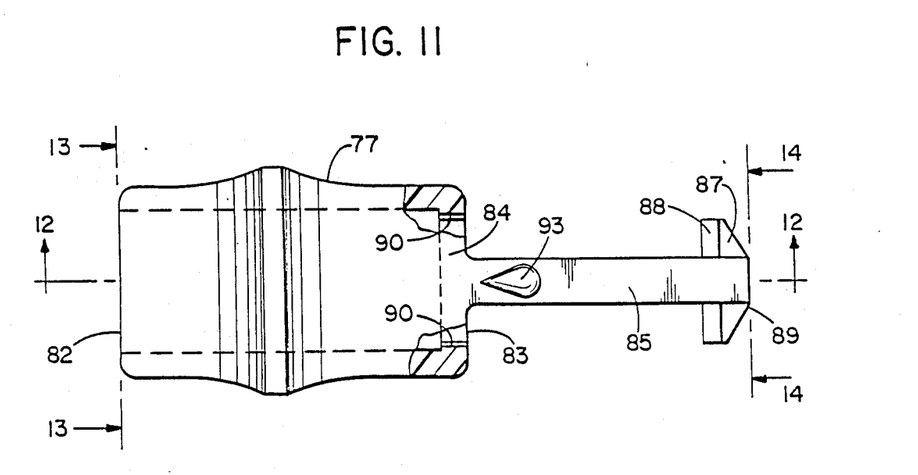
FIG. 11 is an enlarged plan view of the outer sleeve of a male plug according to the invention.
Figure 12:
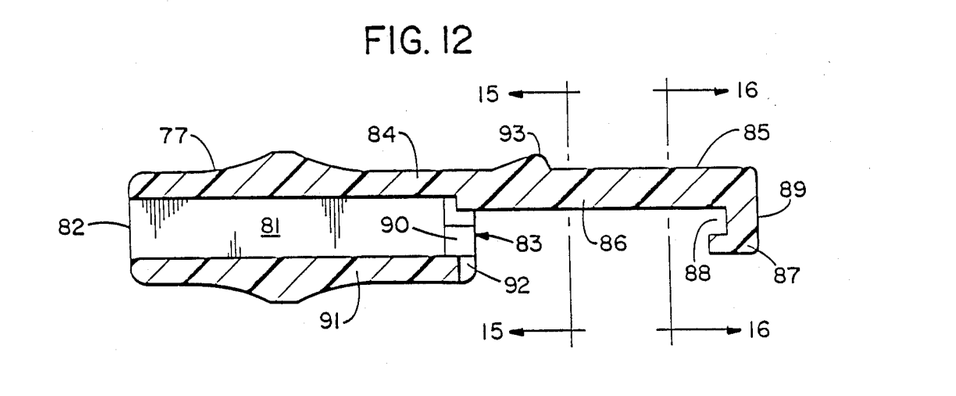
FIG. 12 is a cross-section taken along the line 12—12 of FIG. 11.
Figure 13:
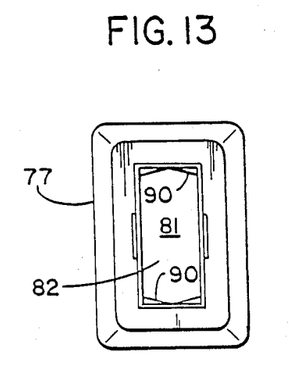
FIGS. 13 and 14 are end views along the lines 13—13 and 14—14 of FIG. 11.
Figure 14:
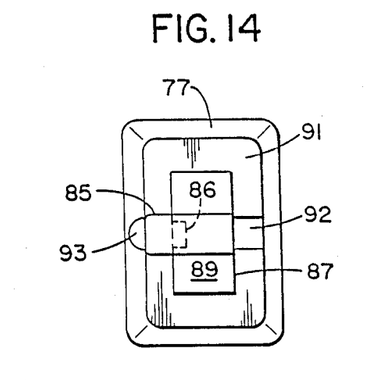

The elongate contact plates of dissimilar metals, such as copper and Constantan, 64 and 65 respectively, are formed to fit onto the molded plastic body 53, as illustrated by FIGS. 8 to 10. Plate 64, such as of copper, has an outward fold 66 at one end, designed to wrap around the end of insert leg 57 and an inward contact fold 67 at the other end, designed to wrap around the end of male leg 58. Plate 64 also has a shoulder 68 and a lower cut-out 69 extending from shoulder 68 a short distance toward to end having fold 66. The molded plastic body 53 is provided with a slot 70 which extends from insert shoulder 71 to the inside surface of leg 57 parallel to leg 57 and having a depth equal to about one-half the width of leg 57. The slot 70 receives the area of the contact plate 64 above the cut-out 69 and permits the plate 64 to be secured to the insert body with the male end of plate 64 seated within the male end recess 58 and with the contact fold 67 of plate 64 extending around the end of the male leg 58 and being received within a segment 60a of the recess 60 in the other surface of the male leg 58. The molded plastic body 53 is also provided with second slot 72, similar to slot 70 but formed into the other surface of the body 53, from shoulder 71 opening onto the inner surface of the other leg 56, as shown by FIG. 9 to receive the contact plate 65, such as of Constantan, more particularly the portion thereof above the cut-out 73, shown in FIG. 10. Contact 65 also has an outward fold 74, for wrap-around engagement with leg 56, a shoulder 75, from which the cut-out 73 extends, and a straight male contact end which is received within the recess 60 on male leg 58. Most preferably the recesses 60 and 60a are provided with opposed narrow retainer strips 76 and 76a which extend a slight distance along the recesses 60 and 60a, on opposite edges of each, and are heat-melted such as by sonic means, to extend a slight distance over the ends of the contact strips 64 and 65 and confine such ends thereunder, within the recesses 60 and 60a. Thus the ends of both contact plates 64 and 65 are secured in spaced relation to each other on the same side surface of the male leg 58 of the adaptor 51, and the male leg 58 of the adaptor can be clamped within the jaws of a monitor coupler of the type illustrated by U.S. Pat. No. 4,392,005 to convert the monitor coupler to one having an external female coupler, namely the female end of the adaptor 51. This avoids the necessity of opening the jaws of the monitor coupler each time a new probe is to be connected, and also converts the monitor coupler to one which accepts probes 14 having male plugs 15 produced according to the present invention, as illustrated by FIGS. 7 and 11 to 20.

Referring to FIG. 7, the probe 14 illustrated therein comprises the male plug 15 having a housing sleeve 77 and a contact-supporting insert 78 connected to a probe cable 79 extending to a conventional sensing element 80 such as a temperature sensitive thermocouple comprising dissimilar insulated metal wires, such as copper and Constantan wires, which are united at the sensing end to form a thermojunction.

Figure 15:
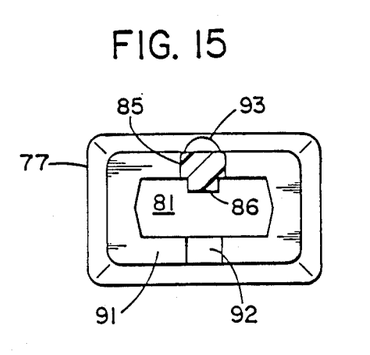
FIGS. 15 and 16 are views taken along the lines 15—15 and 16—16 of FIG. 12.
Figure 16:
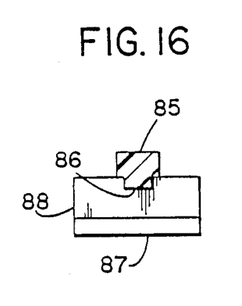
Figure 17:
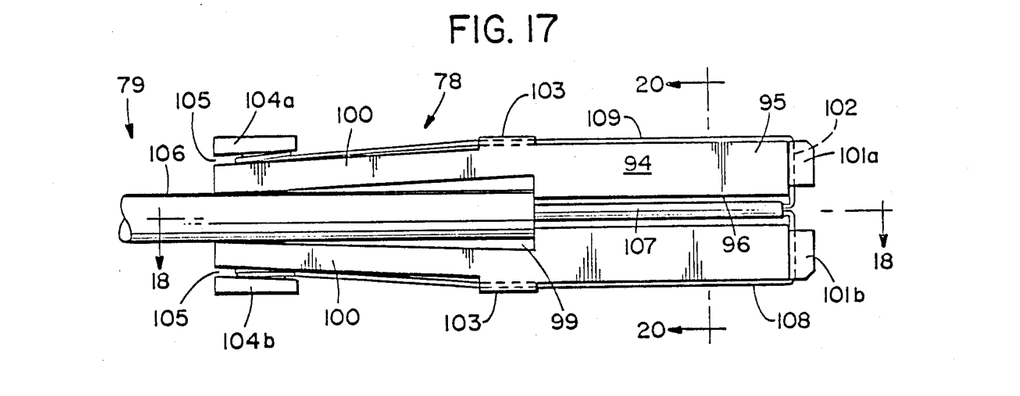
FIG. 17 is an enlarged plan view of a contact-supporting insert member designed for snap-in engagement within the sleeve of FIG. 11 to 16 to provide a male plug connector according to another embodiment of the present invention.
Figure 18:
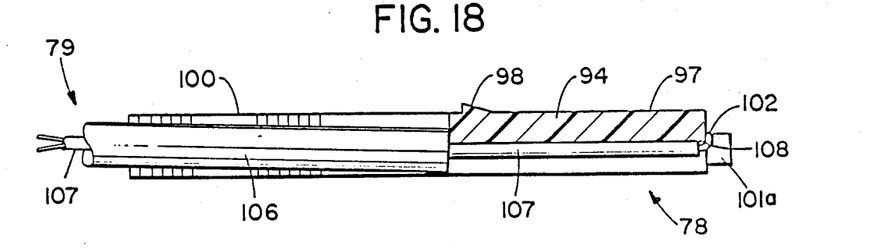
FIG. 18 is a view taken along the line 18—18 of FIG. 17.
Figure 19:
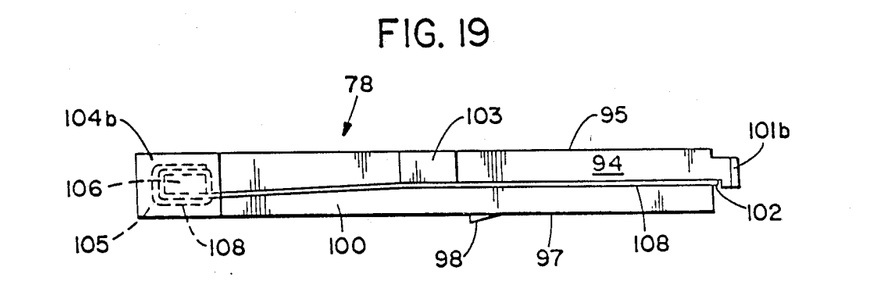
FIG. 19 is a side view of the insert member of FIG. 17.
Figure 20:
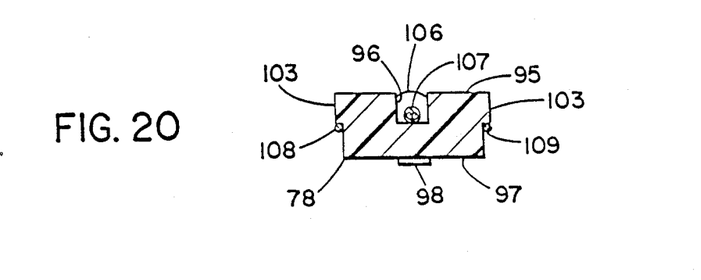
FIG. 20 is an end view along the line 20—20 of FIG. 17.

Referring to FIGS. 11 to 16, the housing sleeve 77 of the male plug 15 has a rectangular elongate central passage 81 having an insert-receiving opening 82 at the cable end and an opposed opening 83, the upper wide wall 84 of the sleeve 77 supporting an elongate finger extension or guide 85 having a lower elongate projection track 86 which extends down into the opening 83 a slight distance, as shown by FIG. 15. Guide 85 terminates in a depending cap member 87 which extends down from the end of guide 85 to a position spaced outwardly from opening 83 along the direction of passage 81, cap member 87 having a projection-receiving interior recess 88 and a contoured exterior engagement surface 89.

The narrow opposed walls of the sleeve 77 are provided with narrow retainer projections 90, adjacent the forward opening 83 to passage 81, and the lower wide wall 91 is provided with a narrow central slot 92, also adjacent the forward opening 83, for purposes relating to the engagement of the plug insert 78. Also, the upper surface of the guide 85 is provided with a projection 93 which functions as a stop member to limit the extent of entry of the plug 15 into a female coupler.

FIGS. 17 to 20 illustrate the structure of the male insert 78 which comprises a wire-supporting insulation body designed for simplicity of wiring and for snap-engagement in oriented position within the housing sleeve 77 of FIGS. 11 to 16. The flat, elongate insert 78 comprises a central body 94 having an upper surface 95 containing a central elongate insulated wire-receiving slot 96, and a lower surface 97 having a central locking ramp 98 projecting therefrom in an area spaced slightly inwardly from the end of a cable receiving slot 99 between flexible, opposed, elongate, wire-attachment legs 100 extending rearwardly from the central body 94 and towards each other The forward end of the upper surface 94 of the insert body 94 carries opposed wire-retaining projections 101a and 101b, one adjacent each side of the slot 96, each projection 101 having a transverse wire-receiving slot 102 on the underside thereof, opening into the mouth of slot 96. The narrow side walls of the male insert 78 carry opposed stop members 103 which project outwardly a slight distance and which extend over only about one-half the height or thickness of the side walls to provide wire passages therebelow. Finally, the outer ends of the legs 100 are provided with narrow shell-engaging pads 104a and 104b, each having a continuous peripheral wire-wrapping slot 105 formed therein, adjacent the outer surface of each leg 100, i.e. each pad 104 is attached to its leg 100 by means of a central post portion 106, shown in FIG. 19.

The male insert 78 of FIGS. 17 to 20 is wired in simple fashion by cutting away the outer insulation sheath 106 from the sensor cable 79, about a two inch length thereof at the end of the cable away from the end attached to the sensor 80, to expose the single insulation wire 107 which contains a pair of dissimilar jacketed metals wires, such as copper and Constantan. Next the insulation is stripped from the wire 107 and the jackets are stripped away from the dissimilar wires, about a 1½ inch length thereof, to expose the wires 108 and 109 of the dissimilar metals. Then the sheath end of the cable 79 is pressed down between the legs 100, with the end of the sheath 106 contacting the insert body 94 adjacent the opening of shot 96 and the insulation wire 107 is extended into slot 96 so that the individual wires 108 and 109 extend out of slot 96 adjacent extension tabs 101a and 101b. Wire 108 is drawn under projection 101b through its slot 102, and around the side wall, under stop member 103 and is wrapped around the base of pad 104b within its wire-wrapping slot 105. Similarly, wire 109 is drawn under tab 101a through its slot 102, and around the other side wall, under the other stop member 103 and is wrapped around the base of pad 104a within its wire-wrapping slot 105. This secures the wires 108 and 109 to the male insert 78, and secures the sheath 106 of the cable 79 between the legs 100 when the male insert 78 is forced into the opening 82 of the housing sleeve 77. Proper orientation is obtained because the insert will only enter the housing passage 81 to its full extent when the upper surface 94 of the insert 78 carrying slot 96, is adjacent the surface of sleeve 77 from which the projection strip 86 of guide 85 extends. Snap assembly is accomplished when the stop members 103 of the insert engage the retainer projections 90 of the sleeve and the insert locking ramp 103 snaps into the sleeve slot 92. At this position the insert tabs 101a and 101b engage within the recess 88 of the cap 87, the outer contoured surface 89 thereof which becomes an engagement or ram surface when the plug is pushed into a receptive female coupler or adaptor to contact the opposed surfaces of the flexible contact plates, 44 and 45 of FIG. 6 or 64 and 65 of FIG. 10, and flex their supporting legs 31 and 32 or 56 and 57 against their bowed shapes to provide a flexible pressure engagement between the wire-exposed sides of the plug and the contact-supporting faces of the flexible bowed legs by the remale connector.

Proper orientation of the male plug relative to the female connector, 12 of FIG. 1 or 51 of FIG. 10, is assured by the presence of the elongate finger extension or guide 85 on the male plug housing sleeve 77, which extends above the forward portion of the top surface 95 if the male insert 78 of the plug, which forward portion is receivable within the mouth 24 of the female connector 12 or coupler 51 only when the plug 15 is oriented so that the finger extension or guide 85 is aligned for reception within the slot 28 in the female housing sleeve 20. This assures that the wire 108 exposed at one side of the plug 15, such as Constantan wire, is aligned for contact with the contact plate 44 of FIG. 6 or 65 of FIG. 10, such as Constantan plate, when the plug is inserted. Also the extent of insertion of the plug 15 into the connector 12 or adaptor 51 is limited by the presence of the projection 93 on the upper surface of the guide 85, forward of the location of opening 83 in sleeve 77 which projection engages the end of sleeve 20 of the connector or adaptor at opening 24 directly above the open end of slot 28 when the plug 15 is fully inserted.

The novel connectors, adaptors and plugs of the present invention, except for their metal contact plates, are molded from polyacetal, polycarbonate or other similar plastic molding compositions which produce molded parts having a high flexure modulus, high fatigue life and high flex and memory properties. The latter properties are most important with respect to the bowed legs 31 and 32 of FIG. 6 and 56 and 57 of FIG. 10. As shown by FIGS. 1 and 7, the legs support the flexible contact plates on their opposed facing surfaces and the legs are bowed towards each other, with their free outer ends being tapered back towards or against the interior side walls of the housing shell 20. Insertion of the male plug 5 into shell opening 24 causes the contoured surface 89 of plug cap 87 to engage the opposed contact plates and spread the legs against the flexibility of their bowed shapes until the wires 108 and 109 exposed at the sides of the plug 15 slidingly engage the contact plates as the plug is pushed into fully inserted position. The friction between the wires 108 and 109 and their contact plates, such as 64 and 65, during the insertion operation is sufficient to provide good electrical contact therebetween. When the plug 15 is withdrawn from the female connectors or adaptor the opposed legs spring back to their original bowed shape for frictional engagement with the next plug 15 inserted therebetween. Thus the shape and composition of the legs avoids the need for separate spring components and/or other means for locking the plug in engagement with the female connectors or adaptor. This reduces the cost of manufacture and assembly of all of the parts, and facilitates coupling and interconnection.

It will be apparent to those skilled in the art that orientation and locking means may be used to assure proper assembly of the component parts of the present connectors, adaptors and plug and proper coupling thereof. Variations and modifications may be made in the structures illustrated by the present drawing without departing from the scope of the present invention as defined by the appended claims.

What is claimed is:

1. An electrical connector assembly comprising an elongate female electrical connector having outlet means at one end for electrical connection to a monitoring device and having female inlet means at the other end for removably receiving the male plug of an electrical element for strong frictional engagement therewithin, said assembly comprising an outer housing sleeve having a central elongate passage forming opposed openings in said sleeve, and an inner contact-supporting elongate flat insert member which is insertable into one of said openings for locking engagement within said housing sleeve, said insert member comprising molded plastic central body portion having an integral pair of spaced elongate flexible bowed legs extending from one end thereof in the direction of the female inlet means of the connector, each of said legs having an intermediate area which is bowed in a direction towards the other to narrow the space therebetween and a free outer end which is tapered away from said intermediate area, a spaced pair of opposed contact plate-receiving retainer slots recessed within said central body, each having a depth greater than its width and opening onto the bowed surface of one of said legs, a pair of opposed elongate bowed metal contact plates each having a width greater than its thickness to provide a wide contact area for electrical connection with contacts and each having an intermediate bowed portion and a free outer end terminating in a loop portion, one each being secured to each of said elongate bowed legs, with its bowed portion in surface contact over the bowed surface thereof, and with its end loop portion in wrap-around engagement with the said free outer end of said leg and extending through a said recessed retainer slot, to provide a spaced pair of conductive passages through said plastic central body, said central body of the insert member also having electrical contact outlet means at the other end thereof, engageable through the other opening in said housing sleeve, for permitting the conduction of electricity from said contact plates through said central plastic body to said outlet means.

2. A connector assembly according to claim 1 comprising a male/female adaptor in which said contact outlet means at the other end of the central body of the insert member comprises an elongate flat male member having means for holding extensions of said contact plates on opposite surfaces thereof, one of said contact plate extensions extending around the end of the male member onto the surface holding the other of said contact plate extensions to provide spaced contact points on the same side of the male member.

3. A connector assembly according to claim 1 in which an interior wall of said housing sleeve contains an elongate slot and said insert member comprises an outer projection which prevents insertion of said insert member within the elongate passage of the sleeve unless said projection is aligned with said slot.

4. A connector assembly according to claim 1 in which said housing sleeve and said insert member contain co-operative engagement means which lock said insert member within said sleeve when the insert member is properly inserted within the sleeve.

5. A connector assembly according to claim 1 in which said contact outlet means at the other end of the central body of the insert member comprises a wire-receiving passage, a portion of which extends through a portion of said central body to said contact plates.

6. A connector assembly according to claim 5 in which said other end of the central body of the insert member comprises a pair of opposed flexible jaws extending in a direction away from the direction of said opposed bow legs, said jaws forming therebetween a portion of said wire receiving passage and being adapted to grip the outer sheath of a wire engaged with said contact plates when said insert member is locked within said housing sleeve.

7. A connector assembly according to claim in which the central body of the insert member comprises two wire-receiving passages, each of which intersects a contact plate-receiving slot, the insertion of each of the contact plates into its slot, against a contact wire present in its wire-receiving passage, automatically stripping insulation from said wire and deforming the bare wire down into said slot into intimate contact with said contact plate.

8. A connector assembly according to claim 7 in which each said contact plate-receiving retainer slot comprises a portion which is parallel to a corresponding portion of the other slot, and another portion which extends in a direction away from said parallel portion to intersect a said wire receiving passage.

* * * * *